3,666,490
PROCESS OF MAKING AN EDIBLE POULTRY
COMPOSITION
Barron S. Whittingham, 3705 S. Robertson Blvd.,
Culver City, Calif. 90230
No Drawing. Continuation-in-part of application Ser. No. 752,747, Aug. 15, 1968. This application Mar. 5, 1971, Ser. No. 121,577
Int. Cl. A22c 21/00
U.S. Cl. 99—108              1 Claim

ABSTRACT OF THE DISCLOSURE

An improved poultry food product and process is provided, whereby poultry meat is prepared so that it may be stuffed into, or otherwise enclosed, in a casing of a thin prepared intestinal or other membranous tissue type; and so that the end product may be sliced, and then fried, grilled or otherwise cooked, all without disintegration.

BACKGROUND OF THE INVENTION

This application is a continuation-in-part of copending application Ser. No. 752,747, filed Aug. 15, 1968 (now abandoned) in the name of the present inventor.

Previous attempts to prepare poultry meat in sausage form have failed because of the inability to produce a product which could be sliced and then fried, grilled, or otherwise cooked, without the product separating from the binder into separate chunks and pieces. Even attempts to overcome the problem by breading the poultry meat in the sausage casing have not met wtih success in the prior art.

The present invention provides a product, and a process for making the product, which is not subject to the drawbacks and limitations of the prior art product described in the preceding paragraph. That is, the present invention provides a poultry meat protein composition which has a semi-solid viscous flowable characteristic, and which is highly flavored by the dispersion of natural fatty compounds and natural gelatinous compounds through the composition.

The composition referred to in the preceding paragraph can be stuffed into various sized membranous casings, as mentioned above, and can be solidified and sterilized by heat. In the solid state, and as pointed out previously herein, the product can be sliced hot or cold and then grilled, fried or otherwise cooked, all without disintegration of the meat from the composition as has been the case in the prior art.

It has been found in the practice of the invention, that when poultry meat is reduced to fibers of from 200–850 microns in diameter, for example, and when the natural collagen, that is, the gelatinous substance found in the connective tissue, bone and cartilage of the fowl, is mixed with the fibers, together with the natural fatty compounds, a highly flavored protein composition is formed.

Generally, the process of the present invention may be practiced by rapidly cooking chicken, or other fowl, in water under pressure; by removing the meat from the bones; by then separating the fats and gelatinous substance from the meat by refrigeration; by then grinding the meat, or otherwise reducing it to fibers by passing the meat through suitable screens as a positive pressure and at ambient temperatures; by then mixing the gelatinous substance and natural chicken fat into the ground meat; stuffing the resulting composition into a suitable casing; and finally solidifying and sterilizing the composition by heat.

It has been found, for example, that when chickens cut into suitable sizes and placed in a pressure vessel with water, in a ratio of 20 parts chicken to one part water, and cooked for from 15–20 minutes at a pressure of the order of 15 pounds, not only are the entrained organisms destroyed, but the meat may be esaily removed from the bones. The aforesaid cooking also causes the formation of protein, fat and gelatinous fractions which subsequently may be separated by refrigeration. When the chicken meat is ground, and mixed with the fat and gelatinous substance, a superior tasting composition is provided.

As indicated above, the fats and gelatinous substance may be fractioned out by placing the hot cooked chicken under refrigeration, but above the freezing point, for from 6 to 12 hours. When the mixture of chicken meat, fats, and gelatinous substance is stuffed into a suitable casing, and then sterilized and solidified by heating, the resulting solid composition, as mentioned above, can be sliced, and then fried or grilled, all without disintegration.

The following description is directed to a particular process for carrying out the concepts of the present invention. However, the various parameters of the process are not particularly critical, and there is no intention to limit the invention by the description of the following specific process.

In carrying out the concepts of the invention, and in accordance with one specific process, 20 pounds of chicken meat first placed in a suitable pressurized vessel, and one-half to one pound of water is added. Any desired seasoning may be incorporated into the pressurized vessel. The resulting chicken meat, water and seasoning are then cooked and sterilized in the pressurized vessel for from 15–20 minutes at 15 pounds pressure.

After cooking, and while the chicken meat is still hot, it is placed under refrigeration, but above freezing, for from 6 to 12 hours. At the end of the period of refrigeration, it will be found that the gelatinous substance adheres to the meat, and solid fats are formed. These fractions may be mechanically separated from the meat, and the meat may be mechanicaly separated from the bone.

After the meat has been mechanically separated from the bones, it is comminuted, for example, in a suitable hammer mill which exerts positive pressure to force the meat through selected screens, so as to produce a homogeneity of substance of micron fibers. The screen opening sizes of the hammer mill may vary, for example, from 0.0079 inch for a resulting 200 micron fiber size, to 0.00328 inch for a resulting 833 micron fiber size, with a 20 mesh screen on Tyler scale.

The resulting homogenous mass is then mixed thoroughly with the previously separated natural fat and gelatinous fractions in proportions, for example, of the order of 15–20 grams of such material to each pound of ground chicken meat. The resulting substance of composition may be characterized as a poultry meat protein slurry, and it may be then stuffed into a suitable animal or synthetic casing, and again sterilized by heating, for example, at 15 pounds pressure for substantially 10 to 15 minutes to solidify the previously fluid protein chicken mass and to destroy airborne pathogens and organisms indigenous to poultry. The resulting solid sterilized composition of the poultry protein is formed because of primary albumen coagulation between the protein fiber and the homogenous mass.

The gelatinous substance produced by the process of the invention may be classified as a mucoid or a conjugated protein, its disintegration with heat into water and other organic substances, enhances the diffusion of inherent flavors through the ground poultry mass during the second sterilization and solidification. Therefore, when the poultry composition is prepared in accordance with the process described above, superior tastes and appearance is produced, and a composition capable of being sliced, and then fried or grilled, all without disintegration, is provided.

Chunks of chicken breasts or thighs of ¼–½ inch in length and thickness, for example, may be added to the composition to enhance its flavor, appearance and taste. The chicken breasts and thighs may be mixed in a ratio of the order of 1–5%.

The invention provides, therefore, an improved process for the production of micron-sized fibers of poultry meat at ambient temperatures and subsequently solidified by heat into a desirable composition, as described above. Although a particular example of the process and product of the invention have been described, modifications may be made, and it is intended to cover in the following claim all such modifications which come within the spirit and scope of the invention.

What is claimed is:

1. The process of making an edible poultry composition which comprises: cooking poultry meat with water in a ratio of 20 parts poultry meat to one part water under pressure of the order of 15 pounds for approximately 15–20 minutes; separating out the natural fat and gelatinous substances of the still hot poultry meat by refrigeration above the freezing point thereof for approximately 6–12 hours; comminuting the poultry meat to a homogenous fibrous form having fibers of 200–850 microns in diameter; reincorporating the previously separated natural fat and gelatinous substances to the comminuted poultry meat to form a poultry composition; stuffing said poultry composition into an enclosing casing of membranous material; and subjecting the stuffed casing to sterilizing heat for a time interval of substantially 10–15 minutes under pressure of the order of 15 pounds to solidify the poultry composition and to destroy airborne pathogens and organisms indigenous to said poultry composition.

References Cited

UNITED STATES PATENTS

| | | | |
|---|---|---|---|
| 2,622,028 | 12/1952 | Torr | 99—107 |
| 3,024,113 | 3/1962 | Torr | 99—107 |
| 3,173,795 | 3/1965 | Torr | 99—108 |

HYMAN LORD, Primary Examiner

U.S. Cl. X.R.

99—107, 109